United States Patent [19]

Caillault et al.

[11] Patent Number: 5,195,830

[45] Date of Patent: Mar. 23, 1993

[54] LEAKTIGHT SENSOR ASSEMBLY WHICH CAN BE INCORPORATED IN A DATA SENSOR BEARING AND BEARING EQUIPPED WITH SUCH AN ASSEMBLY

[75] Inventors: Claude Caillault, Saint Roch; Christophe Houdayer, Tours, both of France

[73] Assignee: SKF France, Clamart Cedex, France

[21] Appl. No.: 909,204

[22] Filed: Jul. 6, 1992

[30] Foreign Application Priority Data

Jul. 5, 1991 [FR] France ............................. 91 08464

[51] Int. Cl.$^5$ ........................................... F16C 19/08
[52] U.S. Cl. ................................................. 384/448
[58] Field of Search ............... 384/448, 446, 544, 589, 384/484

[56] References Cited

U.S. PATENT DOCUMENTS

| | | | |
|---|---|---|---|
| 4,946,295 | 8/1990 | Hajzler | 384/448 |
| 5,004,358 | 4/1991 | Varvello et al. | 384/448 |
| 5,026,178 | 6/1991 | Ballhaus | 384/448 |

FOREIGN PATENT DOCUMENTS

| | | |
|---|---|---|
| 2642483 | 1/1968 | France . |
| 2558223 | 7/1985 | France . |
| 2574501 | 6/1986 | France . |
| 2655735 | 6/1991 | France . |

Primary Examiner—Lenard A. Footland
Attorney, Agent, or Firm—Beveridge, DeGrandi, Weilacher & Young

[57] ABSTRACT

Sensor assembly for data sensor bearing comprising a coder element (11) rigid with the rotating part (6) of the bearing and a sensor element (17, 18) rigid with the fixed part (7) of the bearing and arranged facing the coder element with an air gap, the assembly being produced as a single block with an annular sensor-holder part (15) provided with an annular span (28) for fitment onto the non-rotating race of the bearing, and an annular leaktight carrier part (16) axially offset relative to the sensor-holder part and carrying a leaktight seal (24, 25), the leaktight seal co-operating with the coder element fitted onto the rotating race of the bearing.

Application to vehicle wheel hubs equipped with an ABS system.

19 Claims, 8 Drawing Sheets

LEAKTIGHT SENSOR ASSEMBLY WHICH CAN BE INCORPORATED IN A DATA SENSOR BEARING AND BEARING EQUIPPED WITH SUCH AN ASSEMBLY

The present invention relates to a sensor assembly intended to equip data sensor bearings, especially for vehicle wheel hubs equipped with an anti-lock braking or ABS system.

A number of data sensor bearings are already known which make it possible to provide data relating to rotation characteristics of the rotating part of the bearing, the said rotation part being made rigid with a rotating member.

In particular, French Patent Application 2 640 706 shows a data sensor bearing whose fixed race possesses a mounting slot for a sensor block. A coder element is fitted onto the rotating race and extends within the radial space between the rotating and non-rotating races in such a way that the data sensor is axially opposite the coder element with a small air gap. Such a bearing has significant axial bulkiness since the sensor element is shifted axially outside the bearing, which causes an additional disadvantage of not being able to ensure the leaktightness of the sensor as regards the outside in order to avoid the risks of pollution and malfunctioning of the sensor by penetration of foreign bodies. Furthermore, special machining is required on the non-rotating race of the bearing so as to ensure the fixing of the sensor.

A rotating leaktight seal with incorporated magnetic coder for data sensor bearings is also known through French Patent Application 2 642 483. This document provides for effective protection of the sensor as regards the exterior and interior environment by enclosing it in a leaktight enclosure by means of leaktight lips. However, the particular design of the leaktight seal involves delicate placement of the coder element due to the presence of a rubber leaktight lip on the front face of the carrier of the coder element, since direct press-fitting risks damaging the rubber part. Moreover, the technique also requires a machining of the bearing races so as to obtain surfaces of axial abutment on the races in order accurately to position the coder element axially.

Recently, the Applicant has developed a particular technique consisting in incorporating a sensor element, in the form of a thin flexible sheet provided with a conductor circuit, within an annular sensor block of plastic material furnished with an annular metal component. The metal component forms the carrier of the sensor element and may possibly constitute an insert for axially fitting the sensor block onto the fixed race of a bearing. This technique formed the subject of French Patent Application 2 655 735, but it may be remarked that the sensor block is axially offset relative to the bearing. The axial bulkiness thus created may constitute a constraint in practice.

The object of the present invention is to alleviate the disadvantages of the conventional techniques by virtue of a less bulky sensor assembly of simple structure whose placement within a bearing requires no special machining of the races of the bearing.

The objective of the invention is also to ensure the leaktightness of the data sensor as regards the exterior environment.

Another objective of the invention is to offer easy and accurate mounting of the sensor assembly for a bearing.

The sensor assembly, according to the invention, can be incorporated in a data sensor bearing. The assembly comprises an annular sensor-holder part containing the sensor proper and being mounted onto a corresponding cylindrical surface of the non-rotating race of the bearing, and a concentric annular leaktight carrier part axially offset relative to the sensor-holder part so as to be able to carry a leaktight seal.

The annular sensor-carrier part is preferably entirely within the annular space between the rotating and non-rotating races of the bearing, which can be axially delimited either by the radial plane of an end face of the race which has a larger axial span than the other race, or by the radial plane common to the corresponding end faces of the races of the bearing. In the fitted position, the sensor, the associated coder element and the leaktight seal are all situated in the said annular space of the bearing, thus making the sensor assembly very compact axially.

Preferably, the annular sensor-holder part has a cylindrical fitment span furnished with a tubular metal insert which is fitted onto the non-rotating race of the bearing. Indeed, the sensor assembly is advantageously produced as a single block formed essentially of a plastic material. The tubular metal insert makes it possible to avoid a direct fitment of the plastic onto the non-rotating steel race so as to eliminate any risk of damaging the plastic and of dimensional variations of the plastic with temperature or humidity.

According to the invention, the annular sensor-holder part has a flat support face serving as support span for a fitting tool when mounting and as reference face for the axial positioning of the sensor assembly relative to one of the faces of the bearing.

The leaktight seal is preferably fixed axially onto the annular leaktight carrier part by way of an annular metal reinforcement which has a bend over which are moulded leaktight lips. Preferably, the coder element co-operating with the sensor to deliver data relating to the rotation of the rotating race of the bearing is made rigid with the said rotating race by way of a flange, the coder element carrier flange having a tubular span for fitment onto the rotating race and a radial shoulder onto which is mounted the coder element. The leaktight lip can have two points of contact with the coder element carrier flange, one on the tubular span of the flange and the other on the radial shoulder of the flange.

The fact that the leaktight seal is made fixed makes it possible to overcome unwanted phenomena related to deformations around the leaktight lips, due to centrifugal force and affecting the leaktightness when the speed of rotation of the rotating race is significant. The invention permits separate manufacture of the leaktight seals and incorporation of these seals in the sensor assembly either by overmoulding during the moulding proper of the sensor assembly as a single block, or by axial insertion of the reinforcement of the seal into an axial circular groove provided in the plastic block of the sensor assembly, it being possible to make the reinforcement rigid with the plastic block by gluing, fitment, with a rotational mechanical interlocking ensured by at least one pin formed at the bottom of the circular groove and co-operating with at least one axial notch formed in one end of the reinforcement.

The assembling by axial insertion of the reinforcement of the leaktight seal into a circular groove of the sensor block is of particular interest insofar as it enables leaktight seals to be used whose shape and bulk are such that the placement of the said seal into the mould with a view to overmoulding the sensor block would prove problematic. This solution furthermore makes it possible better to delimit the responsibilities of the manufacturers of speciality elements and to avoid multiple transportation of elements between subcontractors, this having a beneficial effect on manufacturing costs, delivery periods and quality.

Advantageously, the annular leaktight carrier part forms, together with one end of the rotating race of the bearing, a second leaktight seal which can consist of a narrow passage, a labyrinth seal or a leaktight lip forming part of the annular leaktight carrier part.

The sensor assembly can include a connection member in the form of a rod which terminates in a connection head permitting the sensor assembly to be connected up to a signal processing unit equipping the vehicle.

By virtue of the invention, it is possible to produce sensor assemblies in the form of a very simple block which can be mounted by simple fitment onto an ordinary bearing without requiring any specific machining of the latter. Similarly the invention makes it possible to devise an equally simple coder element carrier which can be mounted on the rotating race of a bearing by simple fitment without requiring a particular machining of the rotating race of the bearing. The coder element can be accurately positioned axially by bringing the fitment tool into abutment against a reference face of the bearing. After mounting the sensor assembly in the fixed part of the bearing, an axial interlock element, such as a circlip, can be put in place constituting an axial abutment for the face of the non-rotating race carrying the sensor block.

The technique of the invention can be applied to any type of sensor and coder element since it pertains essentially to the mechanical criteria of the sensor assembly, of the coder element and of the bearing.

The invention will be better understood on studying the detailed description of a few embodiments taken by way of entirely non-limiting example and illustrated by the attached drawings, in which.

Figure 1:
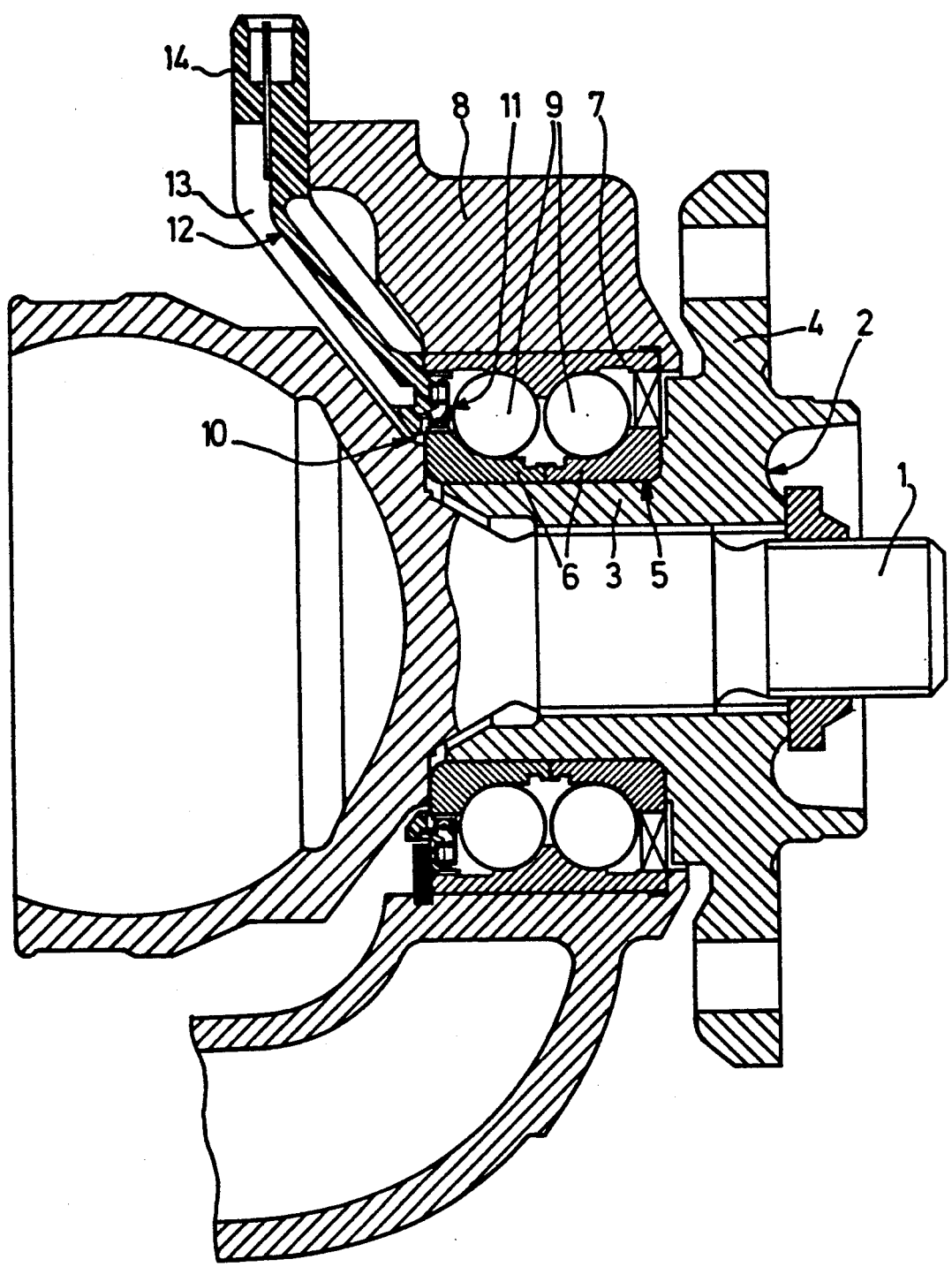
FIG. 1 is an overall view in axial section of a wheel hub equipped with a data sensor bearing according to the invention.

In FIG. 1 is shown a particular application of the invention to a motor vehicle wheel hub. The hub comprises a rotary axle 1 on which is mounted rigid in rotation a rotating element 2 having a tubular span 3 and a radial flank 4 on which are mounted a wheel and a brake disc or drum (not shown). Around the tubular span 3 of the rotating element 2 is mounted a data sensor bearing 5 whose inner races 6 are mounted rigid with the rotating element 2 and whose outer race 7 is mounted rigid with a fixed part 8 of the vehicle. Two rows of bearing balls 9 arranged between the rotating inner races 6 and the fixed outer race 7 ensure normal operation of the bearing 5. On one side of the bearing 5 contrary to the radial flank 4 of the rotating element 2 is mounted a data sensor device 10 which comprises a coder element 11 made rigid with an inner race 6 and a sensor element 12 made rigid with the fixed race 7 with a view to picking up and delivering data relating to the rotation, especially the speed of rotation of the coder element 11, and consequently of the rotating element 2 of the hub. To facilitate electrical connection between the sensor and a signal processing unit (not shown), the sensor assembly 12 has a connection rod 13 terminating in a connection head 14 ensuring the electrical connecting of the sensor to the signal processing unit.

Figure 2:
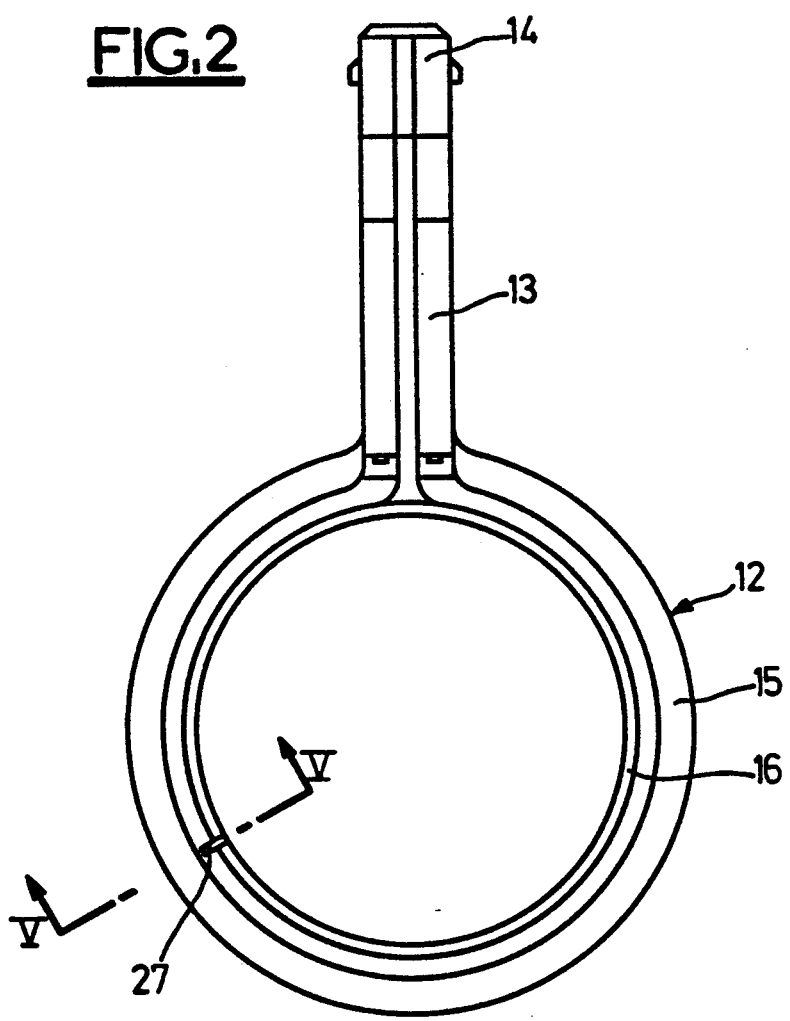
FIG. 2 is an axial view of the sensor assembly equipping the bearing of FIG. 1.

In FIG. 2 is shown the sensor assembly 12 seen from the side opposite the radial flank 4 of the rotating element 2 of FIG. 1. The sensor assembly 12 is produced as a single block by moulding plastic material with in particular the sensor and a metal insert, not shown, whose operation will be described in FIG. 3. The electrical connection between the sensor (not shown) and a signal processing unit (not shown) is produced by means of the connection rod 13 and of the connection head 14. Referring to FIG. 1, the connection rod 13 can be in an axial plane and in an inclined position relative to a radial plane so as to take into account the shapes of other components of the vehicle. The connection head 14 can be kept immobile relative to the fixed component 8 of the vehicle.

Figure 3:
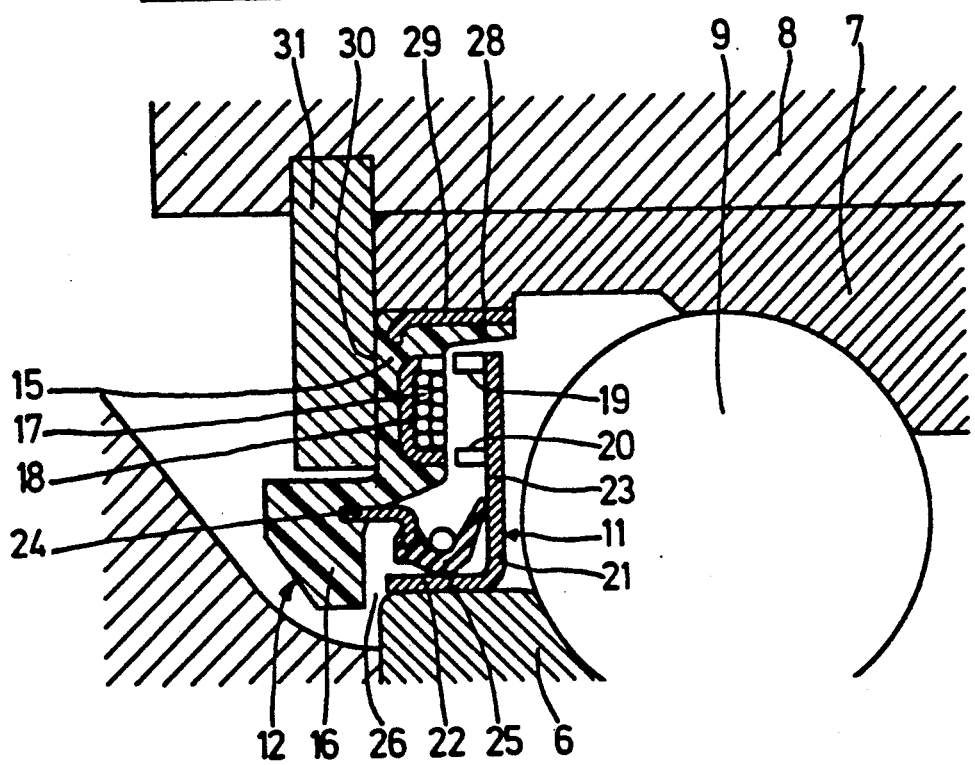
FIG. 3 is a detail view of the data sensor bearing of FIG. 1.

As illustrated in FIG. 3, the sensor assembly 12 comprises an annular sensor-holder part 15 and an annular leaktight carrier part 16, the parts 15 and 16 being axially offset from one another. A passive sensor 17 in the form of a coil co-operating with a magnetic flux concentrator 18 furnished with axial teeth is arranged axially facing the coder element 11. The active part of the coder element 11 consists of two concentric multipole rings 19, 20 which generate, in the flux concentrator 18 during their rotation, an alternating magnetic field varying with a frequency proportional to the speed of rotation of the inner race 6. The multipole rings 19, 20 are made rigid with a carrier flange 21 which comprises a tubular span 22 fitted onto the rotating inner race 6 and a radial part or shoulder 23 on which are mounted the multipole rings 19, 20.

The annular leaktight carrier part 16 of the sensor assembly 12 is axially offset towards the outside of the bearing so as to leave a space for a leaktight seal. The leaktight seal comprises a metal reinforcement 24 having a tubular part, one end of which is made rigid with the annular leaktight carrier part 16 of the sensor assembly and the other end of which has a radial bend in which is mounted a leaktight lip 25 made of rubber for example. The leaktight lip 25 co-operates with the coder element carrier flange 21 on the one hand with the tubular span 22 and on the other hand with the shoulder 23. In the space formed between the leaktight lip 25 and the bottom of the bend formed by the L-shaped flange 21, a lubricating material, such as grease, can be provided so as to reduce wear and friction in the leaktight lip 25 and enhance the leaktightness.

The annular leaktight carrier part 16 of the sensor assembly 12 can extend radially so as to form a narrow passage 26 with the corresponding end of the rotating lower race 6. In this way, the sensor assembly makes it possible to reduce the risk of pollutant particles penetrating as far as the leaktight seal, which in turn completely protects the active part 19, 20 of the coder element 11 and the sensor 17, 18 of the exterior environment.

Figure 5:
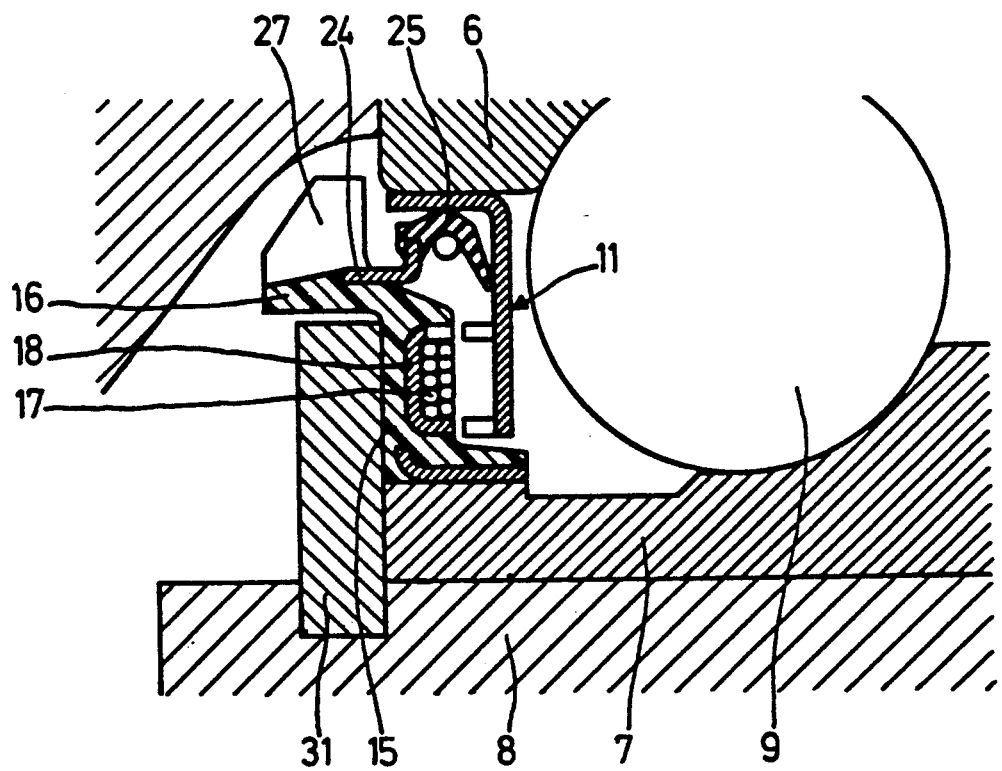
FIG. 5 is a detail view along section V—V of the sensor assembly of FIG. 2.

Referring again to FIG. 2, the annular leaktight carrier part 16 can include an axial drainage groove or drainage channel 27 accommodated in that zone of the said carrier which will be situated lowest after mounting on the bearing mounted on the vehicle, so as to avoid an accumulation of water in this low part. As shown in FIG. 5, the axial drainage groove 27 passes axially through the thickness of the annular leaktight carrier part 16 along the reinforcement 24, but is situated in a position diametrically opposite the position illustrated in FIG. 3.

A drainage channel could also be envisaged in the form of a simple hole passing axially through the annular part of the leaktight carrier 16.

The annular sensor-holder part 15 of the sensor assembly has a cylindrical fitment span 28 including on its external part a metal insert 29 for fitment of the sensor assembly 12 onto the fixed outer race 7 of the bearing. The metal insert 29 will be made rigid with the plastic material block forming the sensor assembly 12 during the moulding of the said block. The anchoring of the metal insert 29 in the plastic block will be effected by any appropriate means (insert with radial holes, serrated collar, local deformations, etc.).

The annular sensor-holder part 15 has a flat support face 30 in a radial plane, also serving as reference face for the axial positioning of the sensor assembly 12. The annular sensor-holder part 15 and the annular leaktight carrier part 16 are preferably situated on either side of the radial plane coinciding with the support face 30.

The invention makes it possible greatly to simplify the mounting, by simple fitment, of the coder element 11 onto the rotating inner race 6 and of the sensor assembly 12 onto the fixed outer race 7. A means of axial immobilisation, such as a circlip 31, axially rigid with the fixed part 8, constitutes an axial abutment for the end face of the fixed outer race 7 of the bearing and for the axial positioning of the support face 30 of the sensor block 12. The circlip 31 will be positioned so that the connection rod 13 crosses through the circumferential opening of the said circlip.

Figure 4:
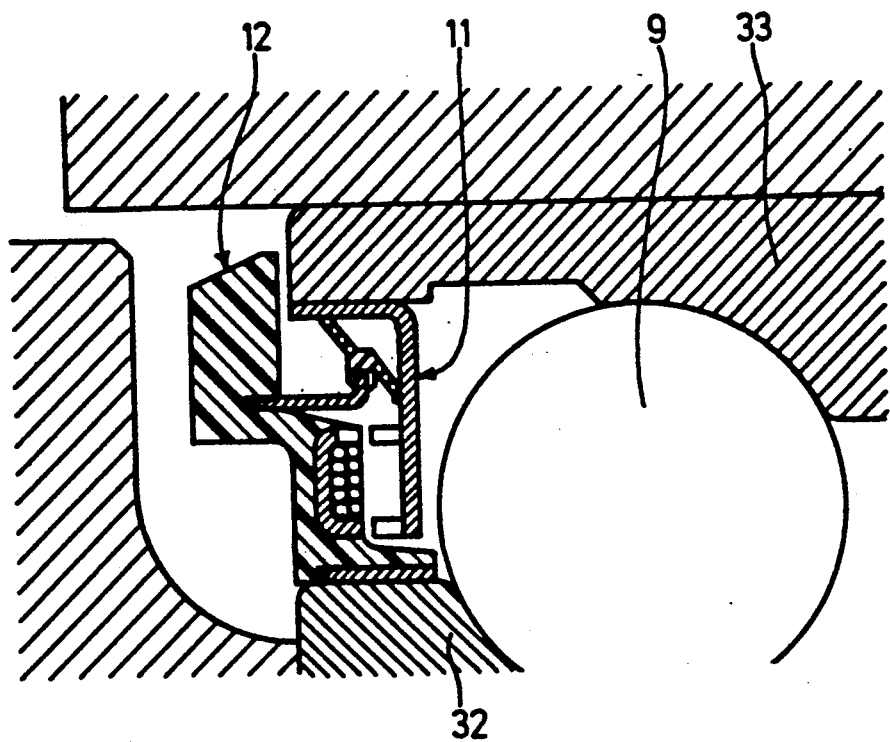
FIG. 4 is a detail view of the bearing according to another embodiment of the invention.

FIG. 4 shows another embodiment of the invention with a bearing whose inner races 32 are fixed and whose outer race 33 can rotate. In this case, it suffices to reverse the arrangement of FIG. 3 by fitting the coder element 11 onto the rotating outer race 33 and the sensor block 12 onto a fixed inner race 32. The actual embodiment presents no technical difficulty.

The embodiments illustrated in FIGS. 6 to 12 differ from the embodiment represented in FIG. 3 only in the design of a second leaktight seal, the said second leaktight seal consisting, in FIG. 3, of the narrow passage 26 between the annular leaktight carrier part 16 and the end of the rotating race 6.

Figure 6:
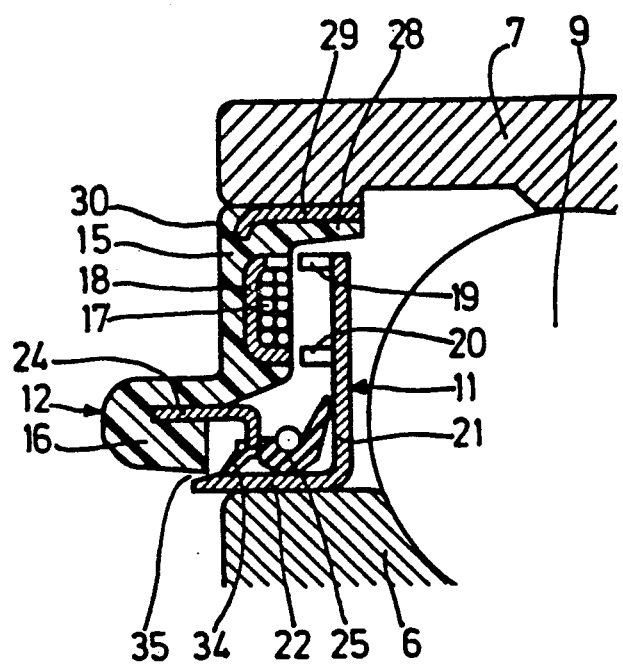
FIG. 6 is a detail view of the data sensor bearing according to another embodiment of the invention.

In FIG. 6, the leaktight seal 24, 25 has an additional leaktight lip 34 which comes into contact with the tubular span 22 of the flange 21 in order to ensure a leaktight role additional to the annular passage 35 formed between the annular leaktight carrier part 16 and the tubular span 22 of the carrier flange 21 of the coder element.

Figure 7:
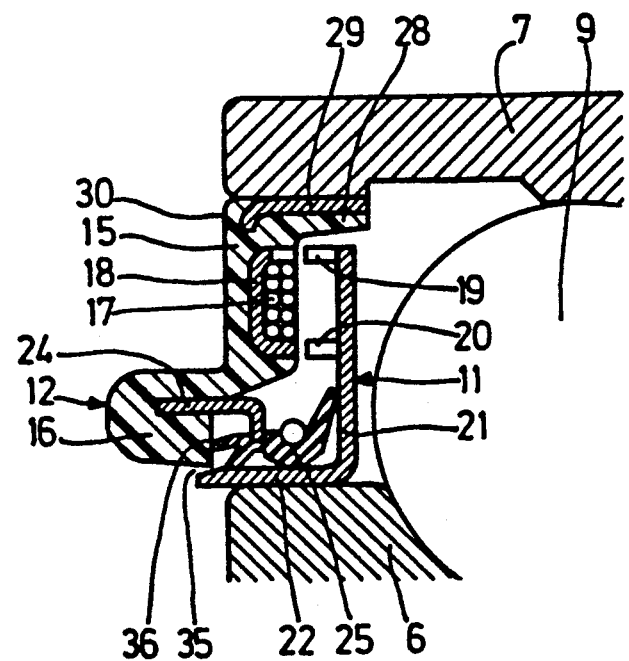
FIG. 7 is a detail view of the bearing according to another embodiment of the invention.

In FIG. 7, the additional leaktight lip 36 comes into contact with the tubular span 22 of the flange 21 on the one hand and with the annular leaktight carrier part 16 on the other hand. As in FIG. 6, the tubular span 22 has an end which projects axially relative to the end of the rotating race 6 and overlaps the annular leaktight carrier part 16 to form a narrow annular passage 35.

Figure 8:
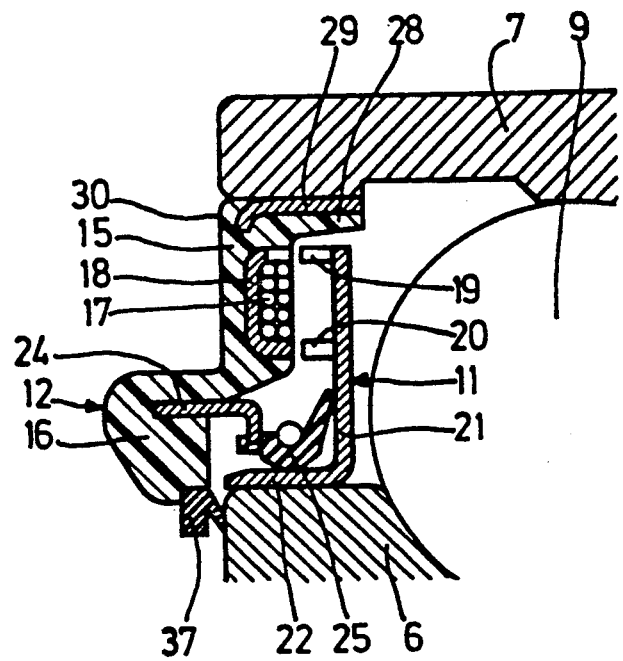
FIG. 8 is a detail view of the bearing according to another embodiment of the invention.

According to FIG. 8, the additional leaktight lip 37 is attached to the annular leaktight carrier part 16 and comes into contact with the end face of the rotating race 6.

Figure 9:
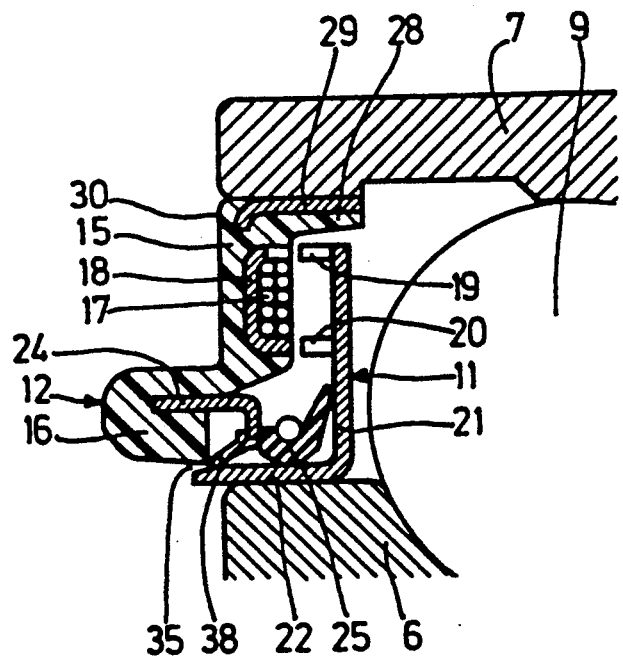
FIG. 9 is a detail view of the bearing according to another embodiment of the invention.

The embodiment illustrated in FIG. 9 is substantially the same as that of FIG. 6. The additional leaktight lip 38 obstructs the narrow passage 35 between the annular leaktight carrier part 16 and the tubular part 22 of the flange 21.

Figure 10:
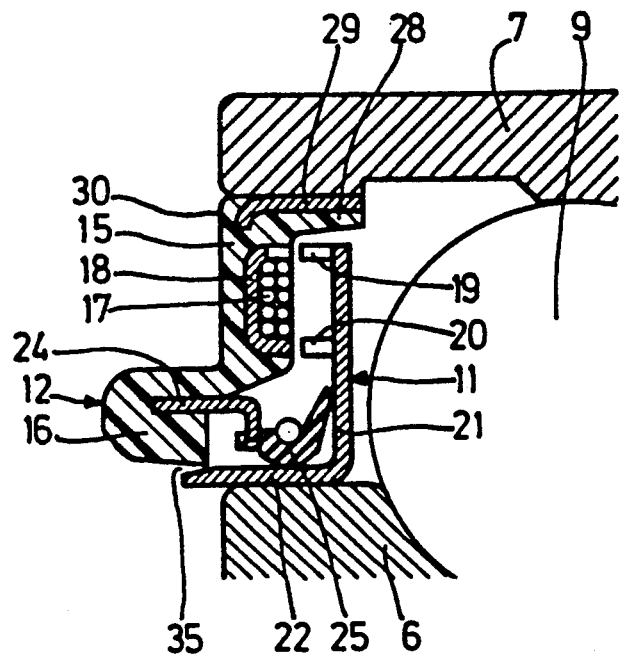
FIG. 10 is a detail view of the bearing according to another embodiment of the invention.

FIG. 10 represents an embodiment without the additional leaktight lip. The tubular span 22 of the flange 21 projects axially relative to the rotating race 6 and extends concentrically inside the annular leaktight carrier part 16 to form a narrow annular passage 35.

Figure 11:
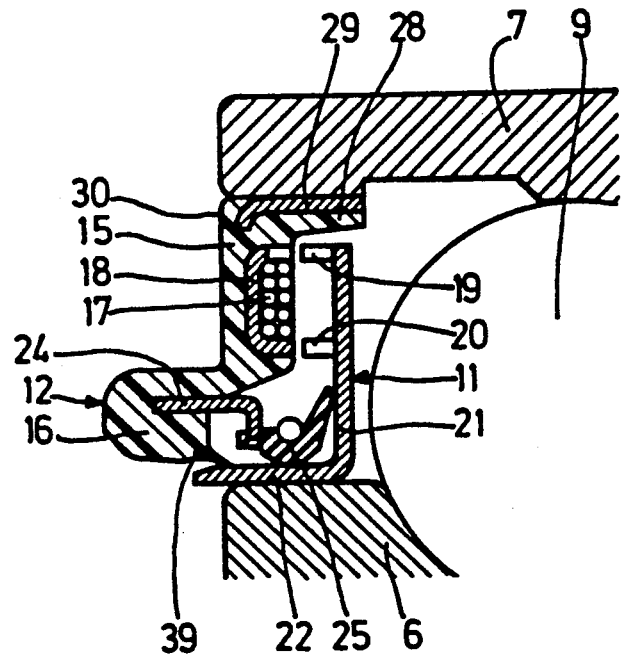
FIG. 11 is a detail view of the bearing according to another embodiment of the invention.

FIG. 11 shows a variant of FIG. 10 in which an additional leaktight lip 39 emerges from the annular leaktight carrier part 16 of which it forms an integral part, in order to come into contact with the tubular span 22 of the flange 21.

Figure 12:
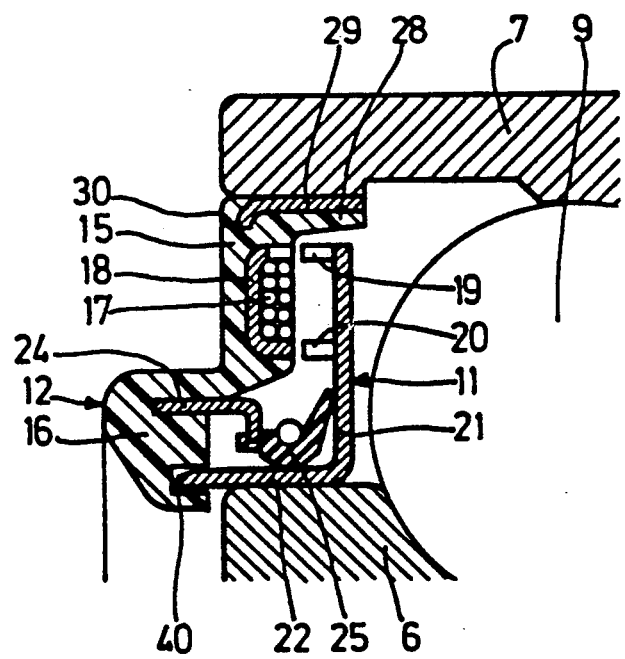
FIG. 12 is a detail view of the bearing according to another embodiment of the invention.

Finally, FIG. 12 represents an embodiment in which the annular leaktight carrier part 16 has an annular groove 40 for receiving the end of the tubular span 22 of the flange 21 projecting axially relative to the rotating race 6, so as to form a labyrinth seal.

The invention offers a number of advantages relative to the systems known hitherto: no special machining on the bearing races is required to receive and/or position the sensor assembly and the associated coder element carrier, thus enabling the fitment spans of the bearing, provided to receive a conventional cartridge seal, to be used directly; the bulkiness of the sensor assembly is reduced in order to leave free the faces of the races of the bearing over an area permitting their axial locking by means of a circlip for example; manufacture and mounting of the coder assembly onto the bearing are greatly simplified relative to the conventional solutions; there is no risk of damaging the lips of the leaktight seal through the mounting of the coder element; axial positioning is accurate and easy in respect of the coder element and the coder assembly, between them and relative to the bearing; the leaktightness of the active parts of the coder element and of the sensor assembly is ensured as regards the exterior environment; the connection head incorporated in the sensor block permits easy electrical connection of the sensor with the remainder of the vehicle's electronic analysis circuit.

We claim:

1. Sensor assembly for data sensor bearing comprising a coder element (11) rigid with the rotating race (6, 33) of the bearing and a sensor element (17, 18) rigid with the fixed race (7, 32) of the bearing and arranged facing the coder element with an air gap, characterised in that it comprises an annular sensor-holder part (15) mounted entirely within the annular space between the rotating and fixed races of the bearing, the said sensor-holder part being provided with an annular span (28) for fitment onto the non-rotating race of the bearing and with a flat support face (30) in a radial plane serving both as reference for the axial positioning of the sensor assembly (12) in the bearing, and an annular leaktight carrier part (16) axially offset relative to and outside the said support face of the sensor-holder part (15) and carrying a leaktight seal (24, 25), which cooperates with the coder element (11) fitted onto the rotating race of the bearing inside the said annular space.

2. Sensor assembly according to claim 1, characterised in that the cylindrical fitment span (28) of the annular sensor-holder part (15) is furnished with a tubular metal insert (29) for fitting the sensor assembly (12) onto the non-rotating race (7, 32) of the bearing.

3. Sensor assembly according to claim 2, characterized in that the annular leaktight carrier part (16) has a leaktight lip (37) in contact with one end of the rotating race of the bearing.

4. Sensor assembly according to claim 2, characterized in that the annular leaktight carrier part (16) forms a narrow passage (26) with one end of the rotating race of the bearing.

5. Sensor assembly according to claim 1, characterised in that the leaktight seal comprises a metal reinforcement (24) of tubular shape, one end of which is made rigid with the annular leaktight carrier part (16) and the other end of which is bent, onto which is fixed a leaktight lip (25).

6. Sensor assembly according to claim 5, characterised in that metal reinforcement (24) of the leaktight seal is made rigid with the annular leaktight carrier part (16) by moulding the plastic material of the said carrier over the said metal reinforcement (24).

7. Sensor assembly according to claim 6, characterized in that the associated coder element (11) includes an annular L-section flange (21) for carrying the active part (19, 20) of the coder element, the leaktight lip (25) coming into contact on the one hand with the tubular span (22) for fitment of the flange and on the other hand with the radial part (23) of the flange.

8. Sensor assembly according to claim 5, characterized in that the associated coder element (11) includes an annular L-section flange (21) for carrying the active part (19, 20) of the coder element, the leaktight lip (25) coming into contact on the one hand with the tubular span (22) for fitment of the flange and on the other hand with the radial part (23) of the flange.

9. Sensor assembly according to claim 5, characterised in that the metal reinforcement (24) is provided with at least one axial notch on one end, and in that the annular leaktight carrier part (16) has an axial circular groove provided with at least one pin at the bottom, the co-operation of the slot with the pin ensuring the mechanical rotational interlocking of the reinforcement relative to the leaktight carrier after mounting.

10. Sensor assembly according to claim 5, characterised in that the associated coder element (11) includes an annular L-section flange (21) for carrying the active part (19, 20) of the coder element, the leaktight lip (25) coming into contact on the one hand with the tubular span (22) for fitment of the flange and on the other hand with the radial part (23) of the flange.

11. Sensor assembly according to claim 10, characterised in that the annular leaktight carrier part (16) forms a narrow passage (35) or a labyrinth seal (40) with the tubular span (22) for fitment of the flange.

12. Sensor assembly according to claim 10, characterised in that the annular leaktight carrier part (16) or the leaktight seal (24, 25) has an additional leaktight lip (34, 36, 38, 39) in contact with the tubular span (22) of the flange.

13. Sensor assembly according to claim 1, characterised in that the annular leaktight carrier part (16) forms a narrow passage (26) with one end of the rotating race (6, 33) of the bearing.

14. Sensor assembly according to claim 1, characterised in that the annular leaktight carrier part (16) has a leaktight lip (37) in contact with one end of the rotating race of the bearing.

15. Sensor assembly according to claim 1, characterised in that it comprises a connection rod (13) terminating in a connection head (14) to ensure the electrical link between the sensor element (17, 18) and a signal processing unit.

16. Sensor assembly according to claim 1, characterised in that in an area corresponding to its low part after mounting on the bearing mounted on a vehicle, the annular leaktight carrier part (16) is provided with an axial drainage groove (27) or with a drainage channel.

17. Sensor assembly according to any one of claims 1-2, 5-6, or 9-16, characterised in that it is produced as a single block by moulding over with a plastic material.

18. Data sensor bearing equipped with a sensor assembly according to claim 1.

19. Sensor assembly according to claim 1, characterized in that the leaktight seal comprises a metal reinforcement (24) of tubular shape, one end of which is made rigid with the annular leaktight carrier part (16) and the other end of which is bent, onto which is fixed a leaktight lip (25).

* * * * *